(12) United States Patent
Lewis et al.

(10) Patent No.: US 11,727,220 B2
(45) Date of Patent: Aug. 15, 2023

(54) TRANSITIONING BETWEEN PRIOR DIALOG CONTEXTS WITH AUTOMATED ASSISTANTS

(71) Applicant: GOOGLE LLC, Mountain View, CA (US)

(72) Inventors: Justin Lewis, Marina Del Rey, CA (US); Scott Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/700,994

(22) Filed: Mar. 22, 2022

(65) Prior Publication Data

US 2022/0215181 A1 Jul. 7, 2022

Related U.S. Application Data

(63) Continuation of application No. 16/622,531, filed as application No. PCT/US2018/020943 on Mar. 5, 2018, now Pat. No. 11,314,944.

(51) Int. Cl.
  *G06F 40/35* (2020.01)
  *G06F 40/20* (2020.01)
  (Continued)

(52) U.S. Cl.
  CPC .............. *G06F 40/35* (2020.01); *G06F 40/20* (2020.01); *G06F 40/211* (2020.01);
  (Continued)

(58) Field of Classification Search
  None
  See application file for complete search history.

(56) References Cited

U.S. PATENT DOCUMENTS 9,576,574 B2 2/2017 van Os
11,087,753 B2 8/2021 Yoshida
(Continued)

FOREIGN PATENT DOCUMENTS

EP 1560200 8/2005
JP 2005215694 8/2005
(Continued)

OTHER PUBLICATIONS

Michaud, Lisa N. "Observations of a new chatbot: drawing conclusions from early interactions with users." IT Professional 20, No. 5 (2018): 40-47. (Year: 2018).*

(Continued)

*Primary Examiner* — Frank D Mills
(74) *Attorney, Agent, or Firm* — Gray Ice Higdon

(57) ABSTRACT

Techniques are described related to prior context retrieval with an automated assistant. In various implementations, instance(s) of free-form natural language input received from a user during a human-to-computer dialog session between the user and an automated assistant may be used to generate a first dialog context. The first dialog context may include intent(s) and slot value(s) associated with the intent(s). Similar operations may be performed with additional inputs to generate a second dialog context that is semantically distinct from the first dialog context. When a command is received from the user to transition the automated assistant back to the first dialog context, natural language output may be generated that conveys at least one or more of the intents of the first dialog context and one or more of the slot values of the first dialog context. This natural language output may be presented to the user.

17 Claims, 12 Drawing Sheets

(51) Int. Cl.
  *G06F 40/253* (2020.01)
  *G06F 40/211* (2020.01)
  *G06F 40/268* (2020.01)
  *G06F 40/295* (2020.01)
(52) U.S. Cl.
  CPC .......... *G06F 40/253* (2020.01); *G06F 40/268* (2020.01); *G06F 40/295* (2020.01)

(56) References Cited

U.S. PATENT DOCUMENTS

| | | | |
|---|---|---|---|
| 11,314,944 | B2 | 4/2022 | Lewis et al. |
| 2014/0074483 | A1* | 3/2014 | van Os ................. G10L 15/22 704/275 |
| 2014/0310001 | A1* | 10/2014 | Kalns ................. G10L 15/30 704/270.1 |
| 2015/0066902 | A1 | 3/2015 | Kim |
| 2015/0149177 | A1 | 5/2015 | Kalns et al. |
| 2016/0164813 | A1* | 6/2016 | Anderson .............. H04L 51/216 709/206 |
| 2016/0283465 | A1* | 9/2016 | Patris ..................... G06V 20/30 |
| 2017/0140755 | A1* | 5/2017 | Andreas ................. G10L 25/51 |
| 2017/0300831 | A1* | 10/2017 | Gelfenbeyn ........ G06F 16/3329 |
| 2018/0052842 | A1 | 2/2018 | Hewavitharana et al. |
| 2018/0061400 | A1 | 3/2018 | Carbune et al. |
| 2018/0075847 | A1* | 3/2018 | Lee .................... G06F 16/24522 |
| 2018/0090135 | A1* | 3/2018 | Schlesinger ............ G10L 15/22 |
| 2018/0190264 | A1* | 7/2018 | Mixter .................. H04L 51/224 |
| 2018/0226066 | A1* | 8/2018 | Harris .................... G06F 40/35 |
| 2019/0034795 | A1* | 1/2019 | Zitouni ................. G06N 5/027 |
| 2019/0066668 | A1* | 2/2019 | Lin ........................ G06N 5/027 |
| 2019/0132265 | A1* | 5/2019 | Nowak-Przygodzki ..................... H04L 12/1822 |
| 2019/0180743 | A1* | 6/2019 | Yoshida ................. G10L 15/02 |
| 2019/0236138 | A1* | 8/2019 | Mahar .................... H04L 51/02 |

FOREIGN PATENT DOCUMENTS

| | | |
|---|---|---|
| JP | 2013080476 | 5/2013 |
| JP | 2017211610 | 11/2017 |
| JP | 2019520661 | 7/2019 |
| KR | 20150036759 | 4/2015 |
| KR | 20160132748 | 11/2016 |

OTHER PUBLICATIONS

Wei, Chen, Zhichen Yu, and Simon Fong. "How to build a chatbot: chatbot framework and its capabilities." In Proceedings of the 2018 10th international conference on machine learning and computing, pp. 369-373. 2018. (Year: 2018).*

The Korean Intellectual Property Office; Notice of Allowance issued for Application No. 10-2020-7028314, 3 pages, dated Jun. 24, 2022.

Japanese Patent Office; Notice of Reasons of Rejection issued in app. No. 2020-546386, 13 pages, dated Aug. 8, 2022.

The Korean Intellectual Property Office; Notice of Office Action issued in Application No. 1020207028314; 19 pages; dated Dec. 8, 2021.

Japanese Patent Office; Notice of Reasons for Rejection issued in Application No. 2020-546386; 11pages; dated Dec. 6, 2021.

Di Prospero, A. et al.; Chatbots as assistants: an architectural framework; In Proceedings of the 27th Annual International Conference on Computer Science and Software Engineering; pp. 76-86; dated 2017.

European Patent Office; Communication Pursuant to Article 94(3) EPC issued in Application No. 18714393.8; 7 pages; dated Sep. 30, 2021.

International Search Report and Written Opinion issued in Application No. PCT/US2018/020943 dated Dec. 6, 2018. 14 Pages 2018.

Duijst, D. "Can We Improve the User Experience of Chatbots with Personalisation?"; Thesis; University of Amsterdam; retrieved from internet: https://www.researchgate.net/profile/Danielle_Duijst/publication/318404775_Can_we_Improve_the_User_Experience_of_Chatbots_with_Personalisation/links/5967ba16a6fdcc18ea662ce7/Can-we-Improve-the-User-Experience-of-Chatbots-with-Personalisation.pdf; 23 pages; dated Jul. 13, 2017.

Kuligowska, K. "Commercial Chatbot: Performance Evaluation, Usability Metrics and Quality Standards of Embodied Conversational Agents;" Professional Center for Business Research, vol. 2; 16 pages; Feb. 5, 2015.

Cahn, J. Chatbot: Architecture, Design, & Development; Senior Thesis, University of Pennsylvania (2017); retrieved from Internet: https://d1wqtxts1xzle7.cloudfront.net/57035006/CHATBOT_thesis_final-libre.pdf?1532064338=&response-content-disposition=inline%3B+filename%3DCHATBOT_Architecture_Design_and_Developm.pdf&Expires=1682101154&Signature=OtWszRhOtI65szI0zU6c81I5pqlIYZfKZQLOS4-SUn6BQ-iRKeqzi~qOfheYzssaObm7Begv8OhCa1FFMghmjmUkoe2grQ7QcBK3FwyUJsqdm0YgksOqyVLtf8VCleO-lvCzCTx0HCeXr5rSrsrA6MajCMIFxttR-feDgU1RiUDnKEqp2QqjNlyvzaGyJ~U3vgwjxI2i3sKvdrJy1yvkNLNthm8ymcYY8~DHD0wun1AOBJ1rW9tpVvsVXjc4CMm87YUhJT15zeNb7VFdzJLGpI7gcD16JoY4xhz2GgJYXv3yrGYH5dJ8t0M-nyZoBAMf3tmWQuSGXvVToG3UDnoOnQA_&Key-Pair-Id=APKAJLOHF5GGSLRBV4ZA.

Lee, I. "Finding Jarvis: An Insider's Look at the Future of Digital Messaging Agents;" The Startup; retrieved from Internet: https://medium.com/swlh/finding-jarvis-an-insider-s-look-at-the-future-of-digital-messaging-agents-7270782f687b; 11 pages; Mar. 29, 2016.

Raghavan, R. "Current State—Chatbot Pitfalls and How Enterprises can Avoid Them;" retrieved from internet: https://www.linkedin.com/pulse/current-state-chatbot-pitfalls-how-enterprises-can-avoid-raghavan/; 4 pages; Jun. 11, 2017.

Zinchenko, P. "Conversational UI: How to Design a Chat Bot for Facebook Messenger;" Blog; retrieved from internet: https://www.mindk.com/blog/designing-a-conversational-ui-2/; 17 pages; Feb. 6, 2018.

Schlotter, K. "IBM Watson Conversation-Node.js; Cognitive Solutions Application Development;" Watson Services Workshop; 36 pages; Nov. 18, 2017.

IBM, "Watson Conversation;" 56 pages; 2017.

European Patent Office; Summons to attend oral proceedings pursuant to Rule 115(1) EPC issued for Application No. 18714292.8, 8 pages, dated Jan. 24, 2023.

* cited by examiner

TRANSITIONING BETWEEN PRIOR DIALOG CONTEXTS WITH AUTOMATED ASSISTANTS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans—which when they interact with automated assistants may be referred to as "users"—may provide commands, queries, and/or requests using free-form natural language input. Free-form natural language may include vocal utterances converted into text using speech recognition and/or typed free-form natural language input.

Automated assistants enable users to obtain information, access services, and/or perform various tasks. For example, users are able to execute searches, get directions, and in some cases, interact with third-party applications. These third-party application interactions, access to which may be facilitated using application programming interfaces ("APIs") provided by automated assistants and/or the third party applications, allow users to perform a variety of actions, such as calling cars from ride-sharing applications, ordering goods or services (e.g., pizza), making reservations, and so forth.

Automated assistants converse with users using voice recognition and natural language processing, with some also utilizing machine learning and other artificial intelligence technologies, for instance, to predict user intents. Automated assistants may be adept at holding conversations with users in natural, intuitive ways, in part because they understand dialog context. To utilize dialog context, an automated assistant may preserve recent inputs from the user, questions that came from the user, and/or responses/questions provided by the automated assistant. For example, the user might ask, "Where is the closest coffee shop?", to which the automated assistant might reply, "Two blocks east." The user might then ask, "How late is it open?" By preserving at least some form of dialog context, the automated assistant is able to determine that the pronoun "it" refers to "coffee shop" (i.e., co-reference resolution).

However, with conventional automated assistants, if the user abandons one topic of the human-to-computer dialog to engage the automated assistant in another, different topic, the dialog context associated with the first topic may be lost. If the user wishes to pick up the previously conversation about the first topic where they left off, the user may be forced to restart the conversation from scratch so that the discarded dialog context can be rebuilt. This loss of dialog context is technically problematic in many common use cases for users, as it may require the user and the assistant to rebuild the context from scratch if the relevant conversation is to be restarted. This may involve the assistant needing to receive particular user inputs for a second time, and to cause such re-received inputs to be re-stored in computer memory. Furthermore, the receipt of such re-inputs may require computer processing capacity to re-process the inputs. Additionally, electrical power from, for example, an on-device battery may be needed to power on-device speaker(s) and/or microphone(s) to allow the assistant to prompt or otherwise converse with the user as the user re-inputs the relevant information for rebuilding the dialog context. One example of such a common use case involves interactions between automated assistants and third-party applications. While automated assistants are able to interact with third-party applications, they often cannot replicate the full functionality of some third-party applications, and therefore must frequently forward the user to the third-party application, e.g., using a deep link displayed in a transcript of the human-to-computer dialog. When the user returns to the automated assistant from the third party application, the previous dialog context may be lost, especially if a significant amount of time has passed since the previous human-to-computer dialog.

This may not be problematic if the user has done little else but go to the third party application, accomplish a task, and then quickly return to the automated assistant, e.g., using a back button provided by an operating system executing on the user's mobile device. In such a scenario, the automated assistant can simply persist the most recent dialog context so that the conversation can be seamlessly resumed. However, with users commonly multitasking and dealing with myriad distractions, the return to the assistant may take many different paths. In a somewhat analogous situation, users of web browsers often use multiple tabs to persist multiple threads of research, trains of thought, etc.

SUMMARY

Techniques are described herein for preserving multiple, semantically-distinct dialog contexts generated during human-to-computer dialogs between users and automated assistants. Additionally, techniques are described herein for enabling users to transition to and/or between the multiple dialog contexts to resume previous conversations with automated assistants, for example by providing a transition command during interaction with a third-party application associated with a particular dialog context. It is not necessary that subject matter underlying two different dialog contexts be completely unrelated in order for the dialog contexts to be considered "semantically distinct." Rather, two dialog contexts may be "semantically distinct" where, for instance, they have mismatched and/or non-overlapping intents, relate to distinct predefined topics from a library of predefined topics, etc.

In various implementations, dialog contexts generated during human-to-computer dialogs may contain a variety of information. In some implementations, a dialog context may include one or more user intents detected based on various signals, such as free-form natural language inputs provided by the user and/or natural language output provided by the automated assistant. In some implementations, a dialog context may also include one or more references to known entities (e.g., people, places, things) that are mentioned (by the user and/or by the automated assistant) during the human-to-computer dialog session.

In some implementations, a dialog context may further include one or more slot values that are usable to fulfill a user's intent, i.e., by filling one or more "slots" associated with the user's intent. A slot value may be any value that is usable as a parameter for a task to be performed by an automated assistant. Slot values may be obtained from various sources. Users may provide slot values proactively and/or in response to solicitation from automated assistants. For example, a particular third party application may require one or more slots to fulfill a request. In some cases, the user may proactively provide values for the required slots. Or, the third party application may cause the automated assistant to solicit values for any required slots for which the user has not proactively provided values. Additionally, other slot values may be determined automatically, e.g., using position coordinates provided by a computing device operated by the user, user preferences, slot values used under similar circumstances in the past, slot values extracted from recent statements by the user and/or the automated assistant, etc.

Dialog contexts may be preserved in various ways. In some implementations, an entire transcript of a human-to-computer dialog may be preserved so that, for instance, a dialog context can be rebuilt or resumed, e.g., on the fly and/or as needed, by detecting intents, slot values, entities, etc. in the preserved transcript. In some implementations, particularly those in which a user interacts with an automated assistant using a graphical user interface ("GUI"), this may provide an additional advantage in that a user may be able to review the transcript. In some cases the transcripts may be annotated with data such as breakpoints, intents, mentioned entities, etc. Additionally or alternatively, in some implementations, only core elements of a dialog context, such as detected intent(s), slot values, mentioned entities, etc., may be preserved in various formats, such as JavaScript Object Notation ("JSON") or other similar formats.

Dialog contexts may be preserved in various locations. In some implementations, dialog contexts may be persisted in memory that is local to the computing device operated by the user to engage with the automated assistant. This may give rise to various technical benefits, such as preserving the user's privacy vis-à-vis prior conversations with the automated assistant, and/or enabling users to revisit prior conversations using techniques described herein, even while offline. Additionally or alternatively, in some implementations, the dialog context may be persisted remotely from the user's computing device, e.g., in memory of one or more computing systems that collectively operate what is often referred to as a "cloud-based service." In various implementations, dialog contexts may be preserved for various amounts of time and/or across various events. For example, in some implementations, dialog contexts may be persisted across multiple logically-distinct dialog sessions. Additionally or alternatively, in some implementations, dialog contexts may be persisted for various amounts of time, such as days, weeks, or other times that may be selected automated and/or set manually by users. In some implementations, dialog contexts may be maintained in memory as a stack, with the most recent dialog context being "pop-able" from the top of the stack to access older dialog contexts.

Preserved dialog contexts may be used by users to resume prior conversations with automated assistants. In this manner, users are able to transition, or "toggle," through previous conversations with automated assistants in an intuitive manner, without losing prior threads and/or thought processes, and without needing to re-input information previously provided to the assistant. In some implementations in which a touch screen, capacitive touch pad, or other visual input/output ("I/O") mechanism is available, a user may be presented with a selectable element, such as a "back button," that the user can operate to transition to prior dialog contexts. This selectable element may be provided, for example, simultaneously with a particular third-party application which has been associated in memory with the prior dialog context. Additionally or alternatively, in scenarios in which a user engages in a human-to-computer dialog with an automated assistant vocally, the user may be able to utter one or more commands, such as "Hey assistant, let's go back to <the prior conversation>," to transition the automated assistant back to a prior dialog context.

In some implementations, an automated assistant may be configured to present the user with an enumerated list of available past dialog contexts, so that the user is able to select which dialog context he or she wishes to revisit. For example, in implementations in which a device operated by a user has display capabilities, the automated assistant may present a visual list of past conversations associated with past dialog contexts from which the user can select, e.g., by touching a list item or speaking a phrase in reference to a list item. In some implementations, the enumerated list of available prior dialog contexts may be presented in response to a user command provided as free-form natural language input, such as "Hey @Assistant, what were we talking about before?"

In some implementations, the automated assistant may be configured to generate a summary of a prior dialog context, e.g., so that the user can be quickly brought up to speed about the prior conversation. For example, in some implementations, the automated assistant may generate natural language output based on the dialog context. The natural language output may convey various aspects of the conversation that lead to generation of the dialog context, such as identifying one or more intents, slot values, mentioned entities, etc. For example, the automated assistant may generate natural language output that reminds the user what they were discussing, as well as any slot values (e.g., pizza toppings) that are already filled.

As an illustrative example, suppose a user previously engaged with an automated assistant to shop for women's' dress shoes in size 7. Suppose further the user was interrupted from the shopping by a text message from a friend to make a dinner reservation, and that the user engaged with the automated assistant (i.e., changes subjects) to open a third party application to make a dinner reservation. When the user returns to the automated assistant to continue shoe shopping, the last dialog context will relate to the dinner reservation. Rather than rebuilding the shoe shopping conversation from scratch, the user may employ techniques described herein to resume the shoe shopping conversation where it left off when the user was interrupted by the friend. In particular, the user may be able to issue one or more commands to transition to the prior dialog context generated while the user shopped for shoes, e.g., by pressing a back button or by issuing one or more vocal commands. This may be achieved by forming an association in computer memory between the prior dialog context and a particular third-party application which is relevant to that context, such as a third-party shoe-shopping application. Once back in the shoe-shopping application, the user may be able to issue a transition command to return to the assistant in the prior dialog context—i.e. shopping for women's dress shoes in size 7. This may involve pressing a back button displayed or otherwise provided simultaneously with the shoe-shopping application. The transition command may cause the stored association between the shoe-shopping application and the shoe-shopping context to be used to resume the shoe shopping conversation in the assistant. Similarly, if the user wishes to subsequently return to the dinner reservation conversation, the user may, once back in the third-party dinner reservation application, issue a transition command to return to the assistant in the dinner reservation context. This may involve pressing a back button displayed or otherwise provided simultaneously with the dinner reservation application.

In some implementations, a vocal command to resume a prior dialog context may be matched to a prior dialog context based on language uttered by the user. Continuing the above example, the user may say something like, "Hey Assistant, let's go back to shoe shopping." The automated assistant may identify the prior dialog context that is most similar to "shoe shopping," and may resume that conversation with the pertinent intents/slot values populated.

In some implementations, one or more breakpoints may be inserted into a transcript of the conversation, e.g., in association with changes in dialog context. For example, if a user begins discussing shoe shopping, but then changes the subject to the weather, two breakpoints may be inserted into the transcript, one for each dialog context. In some such implementations, when the user transitions between prior dialog contexts (e.g., by pressing a back button), the portion of the transcript associated with the selected dialog context may be loaded on the screen, e.g., by using the breakpoint associated with that dialog context. In this manner, a user is able to view the entire portion of the prior conversation that is pertinent to the topic the user wishes to revisit.

In various implementations, a method may include the following: receiving, at one or more input components of a computing device operated by a user, one or more instances of free-form natural language input from the user during a human-to-computer dialog session between the user and an automated assistant implemented at least in part by one or more of the processors; generating a first dialog context based on the one or more instances of free-form natural language input, wherein the first dialog context includes one or more intents of the user and one or more slot values associated with the one or more intents; after generating the first dialog context, receiving, at one or more of the input components, one or more additional instances of free-form natural language input from the user during the same human-to-computer dialog session or a different human-to-computer dialog session between the user and the automated assistant; generating a second dialog context based on the one or more additional instances of free-form natural language input, wherein the second dialog context includes one or more additional intents of the user, and wherein the second dialog context is semantically distinct from the first dialog context; receiving, at one or more of the input components, a transition command from the user to transition the automated assistant back to the first dialog context; based on the first dialog context, generating natural language output that conveys at least one or more of the intents of the first dialog context and one or more of the slot values of the first dialog context; and causing the natural language output to be presented at the same computing device or a different computing device operated by the user.

In various implementations, the transition command may include free-form natural language input uttered or typed by the user. In various implementations, the transition command may include selection by the user of a selectable user interface element. In various implementations, the selectable user interface element may include a back button. In various implementations, the back button may be displayed on a touchscreen of the computing device operated by the user. In various implementations, the computing device operated by the user may be a standalone interactive speaker, and the back button is displayed on a capacitive touch surface of the standalone interactive speaker.

In various implementations, the automated assistant may cause a graphical user interface ("GUI") to be rendered on the computing device of the user, wherein the GUI presents a transcript of messages exchanged between the user and the automated assistant during the human-to-computer dialog. In various implementations, the method may further include causing a distinct software application to be launched on the computing device of the user in response to one or more of the intents of the first dialog context, wherein causing the distinct software application to be launched comprises causing another GUI associated with the distinct software application to be presented to the user in place of the GUI presented by the automated assistant, and wherein the transition command is received via a selectable element of the another GUI. In various implementations, the transcript of messages may include a first break point associated with the first dialog context and a second breakpoint associated with the second dialog context, and the transition command causes a portion of the transcript associated with the first break point to be rendered in the GUI presented by the automated assistant.

In various implementations, the method may further include receiving, at one or more of the input components, a list dialog contexts command from the user for the automated assistant to provide a list of preserved dialog contexts; and in response to the list dialog contexts command: identifying at least the first and second dialog contexts; and causing information indicative of at least the first and second dialog contexts to be presented at the same computing device or the different computing device operated by the user. In various implementations, the transition command may include selection, by the user, of an element of the information indicative of at least the first and second dialog contexts that corresponds to the first dialog context.

In another aspect, a method may include: receiving, at one or more input components of a computing device operated by a user, one or more instances of free form natural language input from the user during a first human-to-computer dialog between the user and an automated assistant implemented at least in part by one or more of the processors; associating one or more stored first parameters of the first human-to-computer dialog between the user and the automated assistant with a first third party application accessible by the user from the first human-to-computer dialog between the user and the automated assistant; receiving, at one or more input components of the computing device, one or more further instances of free form natural language input from the user during a second human-to-computer dialog between the user and the automated assistant; and subsequent to the second human-to-computer dialog between the user and the automated assistant, and in response to receipt of a transition command from the user to transition from the first third party application to the automated assistant, retrieving the stored one or more first parameters associated with the first third party application and using the retrieved first parameters to resume the first human-to-computer dialog between the user and the automated assistant.

In various implementations, the method may further include causing the one or more first parameters of the first human-to-computer dialog between the user and the automated assistant to be stored in computer memory. In various implementations, retrieving the stored one or more first parameters may include retrieving the one or more first parameters from the computer memory. In various implementations, the computer memory is located in a remote server.

In various implementations, storing the one or more first parameters may include creating a configuration file for the one or more first parameters and storing the configuration file in the computer memory. In various implementations, the one or more first parameters are indicative of a context of the first human-to-computer dialog. In various implementations, the one or more first parameters may include one or more intents of the user in the first human-to-computer dialog and/or one or more slot values associated with the one or more intents of the user in the first human-to-computer dialog.

In various implementations, associating the one or more stored first parameters of the first human-to-computer dialog with the first third party application may include creating a first token which is invokable by the one or more processors, in response to the receipt of the transition command to transition from the first third party application to the automated assistant, to retrieve the stored one or more first parameters associated with the first third party application.

In various implementations, the first token may include a link between the stored one or more first parameters and the first third party application. In various implementations, the method may further include: associating one or more second parameters of the second human-to-computer dialog between the user and the automated assistant with a second third party application accessible by the user from the second human-to-computer dialog between the user and the automated assistant. In various implementations, and in response to receipt of a transition command from the user to transition from the second third party application to the automated assistant, the method may include retrieving the stored one or more second parameters associated with the second third party application and using the retrieved second parameters to resume the second human-to-computer dialog between the user and the automated assistant.

In various implementations, associating the one or more stored second parameters of the second human-to-computer dialog with the second third party application may include creating a second token which is invokable, in response to the receipt of the transition command to transition from the second third party application to the automated assistant, by the one or more processors, to retrieve the stored one or more second parameters associated with the second third party application. In various implementations, the second token may include a link between the stored one or more second parameters and the second third party application.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
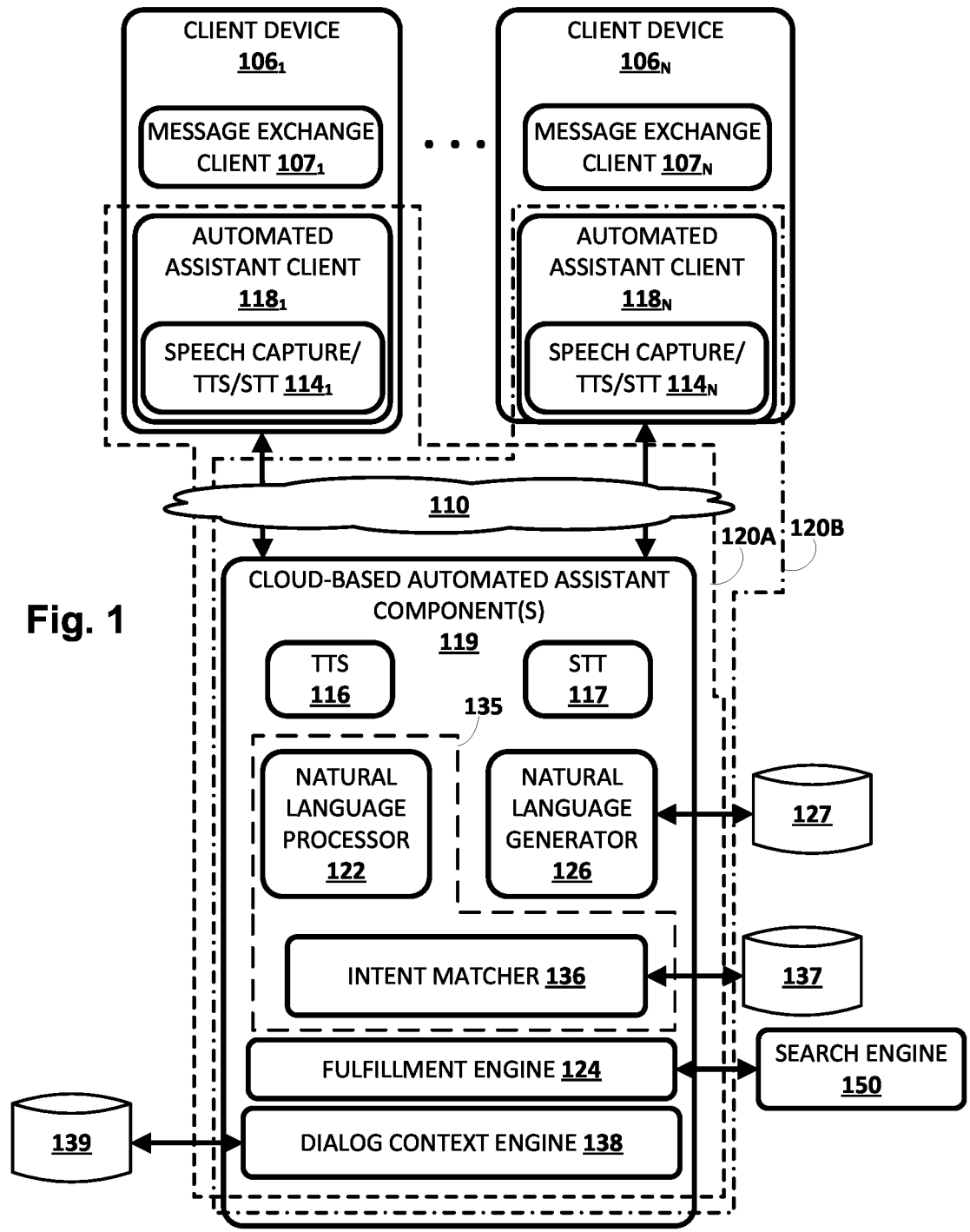
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language understanding engine 135, may be implemented on one or more computing systems (collectively referred to as a "cloud" computing system) that are communicatively coupled to client devices $106_{1-N}$ via one or more local and/or wide area networks (e.g., the Internet) indicated generally at 110.

In some implementations, plurality of client computing devices $106_{1-N}$ (also referred to herein simply as "client devices") may be associated with each other in various ways in order to facilitate performance of techniques described herein. For example, in some implementations, plurality of client computing devices $106_{1-N}$ may be associated with each other by virtue of them being members of a coordinated ecosystem of client devices 106 that are operated by one or more users (e.g., an individual, a family, employees of an organization, other predefined groups, etc.).

In some implementations, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119.

It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, the user can utter commands, searches, etc., and automated assistant 120 may utilize speech recognition to convert the utterances into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various embodiments, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118. In various implementations, speech capture/TTS/STT module 114 may generate speech recognition output based on a vocal query.

Each speech capture/TTS/STT module 114 may be configured to perform one or more functions: capture a user's speech, e.g., via a microphone; convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language understanding engine 135, the aforementioned TTS module 116, the aforementioned STT module 117, and other components that are described in more detail below. In some implementations, one or more of the engines and/or modules of automated assistant 120 may be omitted, combined, and/or implemented in a component that is separate from automated assistant 120. In some implementations, to protect privacy, one or more of the components of automated assistant 120, such as natural language understand engine 135, speech capture/TTS/STT module 114, etc., may be implemented at least on part on client devices 106 (e.g., to the exclusion of the cloud).

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form natural language input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, change of input/output ("I/O") modalities employed by the user, and so forth.

Natural language processor 122 of natural language understanding engine 135 processes natural language input generated by users via client devices $106_{1-N}$ and may generate annotated output (e.g., in textual form) for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a morphological engine that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding engine 135 may also include an intent matcher 136 that is configured to determine, based on the annotated output of natural language processor 122, an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" engine 135.

Intent matcher 136 may use various techniques to determine an intent of the user. In some implementations, intent matcher 136 may have access to one or more databases 137 that include, for instance, a plurality of mappings between grammars and responsive actions (or more generally, intents). Additionally or alternatively, in some implementations, one or more databases 137 may store one or more machine learning models that are trained to generate output indicative of user intent, based on the user's input.

Grammars may be selected, formulated (e.g., by hand), and/or learned over time, e.g., to represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In contrast to many grammars (which may be created manually), machine learning models may be trained automatically, e.g., using logs of interactions between users and automated assistants. Machine learning models may take various forms, such as neural networks. They may be trained in various ways to predict user intent from user input. For example, in some implementations, training data may be provided that includes individual training examples. Each training example may include, for instance, free form input from a user (e.g., in textual or non-textual form) and may be labeled (e.g., by hand) with an intent. The training example may be applied as input across the machine learning model (e.g., a neural network) to generate output. The output may be compared to the label to determine an error. This error may be used to train the model, e.g., using techniques such as gradient descent (e.g., stochastic, batch, etc.) and/or back propagation to adjust weights associated with hidden layer(s) of the model. Once such a model is trained with a (usually large) number of training examples, it may be used to generate output that predicts intents from unlabeled free-form natural language inputs.

In some implementations, automated assistant 120 may facilitate (or "broker") transactions between users and third party applications. These third party applications may or may not operate on computing systems that are separate from those that operate, for instance, cloud-based automated assistant components 119. Accordingly, one kind of user intent that may be identified by intent matcher 136 is to engage a third party application. For example, automated assistant 120 may provide access to an application programming interface ("API") to a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

Fulfillment engine 124 may be configured to receive the intent output by intent matcher 136, as well as any associated slot values (whether provided by the user proactively or solicited from the user) and fulfill the intent. In various embodiments, fulfillment of the user's intent may cause various fulfillment information to be generated/obtained, e.g., by fulfillment engine 124. As will be described below, the fulfillment information may in some implementations be provided to a natural language generator ("NLG" in some FIGS. 126, which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to fulfillment engine 124, which as depicted in FIG. 1 may be in communication with one or more search engines 150 configured to search corpuses of documents and/or other data sources (e.g., knowledge graphs, etc.) for responsive information. Fulfillment engine 124 may provide data indicative of the search query (e.g., the text of the query, a reduced dimensionality embedding, etc.) to search engine 150. Search engine 150 may provide responsive information, such as GPS coordinates, or other more explicit information, such as "Timberline Lodge, Mt. Hood, Oreg." This responsive information may form part of the fulfillment information generated by fulfillment engine 124.

Additionally or alternatively, fulfillment engine 124 may be configured to receive, e.g., from natural language understanding engine 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

As noted above, natural language generator 126 may be configured to generate and/or select natural language output (e.g., spoken words/phrases that are designed to mimic human speech) based on data obtained from various sources. In some implementations, natural language generator 126 may be configured to receive, as input, fulfillment information associated with fulfillment of an intent by fulfillment engine 124, and to generate natural language output based on the fulfillment information. Additionally or alternatively, natural language generator 126 may receive information from other sources, such as third party applications (e.g., required slots), which it may use to formulate natural language output for the user.

A dialog context engine 138 may be configured to persist, and make available, dialog contexts between user(s) and automated assistant 120. In some implementations, dialog context engine 138 may persist (e.g., store) dialog contexts in one or more databases 139 that are remote from client devices $106_{1-N}$. Additionally or alternatively, dialog contexts may be stored in memory that is local to one or more client devices 106, e.g., to maintain user privacy and/or so that techniques described herein may be practiced even when client devices 106 are offline. In some such implementations, dialog context engine 138 may be implemented in whole or in part on client device(s) 106.

In various implementations, dialog contexts generated during human-to-computer dialogs and managed by dialog context engine 138 may contain a variety of information. In some implementations, a dialog context may include one or more user intents detected, e.g., by intent matcher 136, based on various signals, such as free-form natural language inputs provided by the user and/or natural language output generated by, for instance, natural language generator 126. In some implementations, a dialog context may also include one or more references to known entities (e.g., people, places, things) that are mentioned (by the user and/or by the automated assistant) during the human-to-computer dialog session and detected by the aforementioned entity tagger.

In some implementations, a dialog context may further include one or more slot values that are usable to fulfill a user's intent, i.e., by filling one or more slots associated with the user's intent. Slot values may be obtained from various sources, as described previously. Dialog contexts may be preserved by dialog context engine 138 in various ways. In some implementations, an entire transcript of a human-to-computer dialog may be preserved in database 139 or in memory local to a client device 106 so that, for instance, a dialog context can be rebuilt, e.g., on the fly and/or as needed, by detecting intents, slot values, entities, etc. in the preserved transcript. In some implementations, particularly those in which a user interacts with automated assistant 120 using message exchange client 107, this may provide an additional advantage in that a user may be able to review the transcript visually. Additionally or alternatively, in some implementations, only core elements of a dialog context, such as detected intent(s), slot values, mentioned entities, etc., may be preserved in various formats, such as JavaScript Object Notation ("JSON") or other similar formats.

Various components of FIG. 1, such as dialog context engine 138, may be configured to perform selected aspects of the present disclosure for preserving multiple, semantically-distinct dialog contexts generated during human-to-computer dialogs between users and automated assistant 120. Additionally, techniques are described herein for enabling users to transition to and/or between the multiple dialog contexts to resume previous conversations with automated assistants. For example, in some implementations, users are able to transition, or "toggle" through previous conversations with automated assistant 120 in an intuitive manner, without losing prior threads and/or thought processes. In some implementations in which a touch screen, capacitive touch pad, or other visual input/output ("I/O") mechanism is available on client device 106, a user may be presented with a selectable element, such as a "back button," that the user can operate to transition to prior dialog contexts. Additionally or alternatively, in scenarios in which a user operates a client device 106 to engage in a human-to-computer dialog with automated assistant 120 vocally, the user may be able to utter one or more commands, such as "Hey assistant, let's go back to <the prior conversation>," to transition automated assistant 120 back to a prior dialog context.

FIGS. 2A, 2B, 2C, and 2D depict an example dialog between a user, another user, and an automated assistant 120 implemented at least in part on a computing device 206 operated by the user. These Figures illustrate various aspects of the present disclosure, particularly the ability of the user to transition between multiple different past dialog contexts to resume past conversations. In FIGS. 2A-D, client device 206 includes a touchscreen 240, various user interface buttons 281, 282, 283, a text input field 288, and a microphone icon 289. Microphone icon 289 may be operable to enable the user to provide voice input, which may be speech recognized, e.g., by speech capture/TTS/STT module 114, and used, for instance, to populate text input field 288.

Figure 2A:
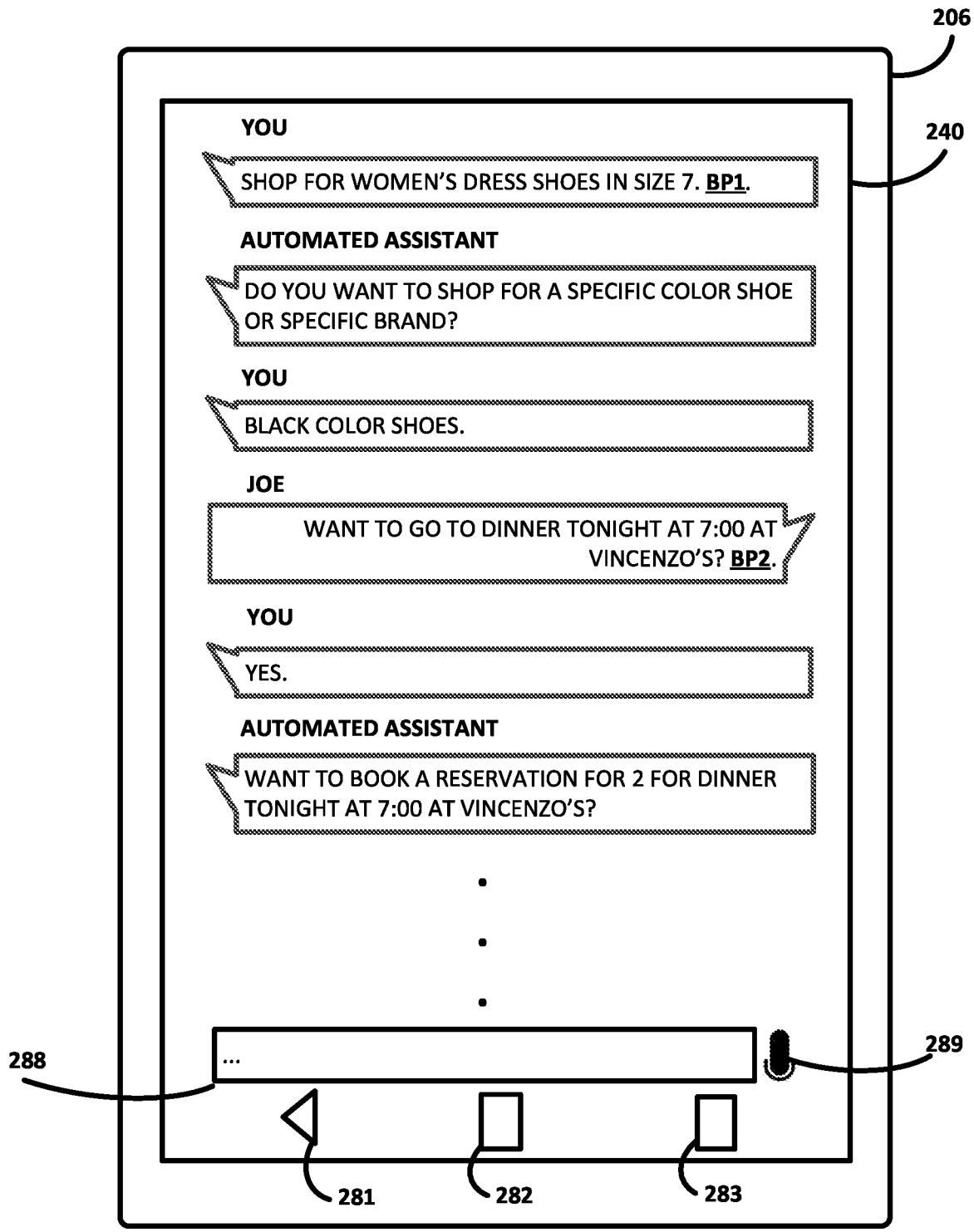
FIG. 2A, FIG. 2B, FIG. 2C, and FIG. 2D depict example dialog between a user, another user, and an automated assistant using a computing device of the user, in accordance with various implementations.

In FIG. 2A, the user operating client device 206 ("You") provides the following free-form natural language input (e.g., using input field 288): "SHOP FOR WOMEN'S DRESS SHOES IN SIZE 7." In some implementations, because this statement initiates a new topic of conversation, a breakpoint associated with the topic of show shopping may be created and associated with the transcript, as indicated by the label "BP1," which is included in the Fig. for illustrative purposes and may or may not actually be rendered on touchscreen 240. The automated assistant asks, "DO YOU WANT TO SHOP FOR A SPECIFIC COLOR SHOE OR SPECIFIC BRAND?," as a way of seeking slot values for a predicted intent of SHOE_SHOPPING. The user provides a slot value by replying, "BLACK COLOR SHOES".

At this point, another user named Joe sends the user a message that appears as part of the transcript, and which reads, "WANT TO GO TO DINNER TONIGHT AT 7:00 AT VINCENZO'S?" At this point another breakpoint, BP2 in FIG. 2A, may be inserted into the transcript to signify the beginning of a new dialog context, dinner tonight. The user responds, "YES," and in response, the automated assistant chimes in, "WANT TO BOOK A RESERVATION FOR 2 FOR DINNER TONIGHT AT 7:00 AT VINCENZO'S?"

Figure 2B:
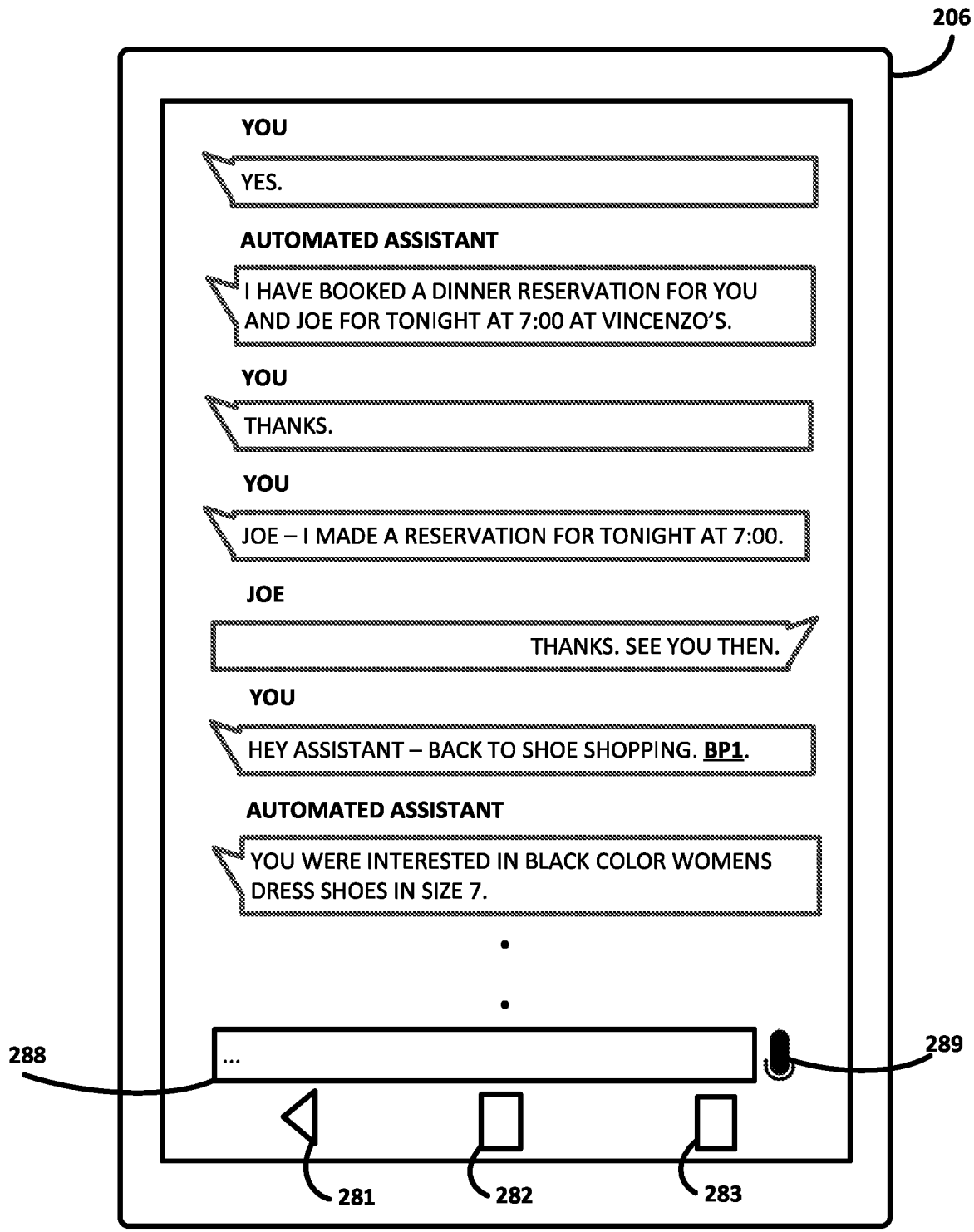

The conversation continues in FIG. 2B. The user responds in the affirmative ("YES") to the automated assistant's offer to make a reservation. Once that intent (making a dinner reservation with parameters of 7:00 PM and "Vincenzo's") is fulfilled, the automated assistant, e.g., by way of natural language output generator 126 in FIG. 1, generates and outputs the text, "I HAVE BOOKED A DINNER RESERVATION FOR YOU AND JOE FOR TONIGHT AT 7:00 AT VINCENZO'S." Joe then chimes in again, "THANKS. SEE YOU THEN.""

At this point, there have been two dialog contexts active during this conversation between the user and the automated assistant: the one associated with BP1 that relates to shoe shopping and the other associated with BP2 that relates to making the dinner reservation. Data indicative of these dialog contexts may be persisted, e.g., by dialog context engine 138 in database 139. Thereafter, the user may be able to transition back through these dialog contexts (and perhaps other dialog contexts that occurred prior to BP1) so that the user can resume those past conversations without starting from scratch.

The user may be able to transition back through these dialog contexts in various ways. In some implementations, the user may toggle backwards through past dialog contexts by operating a back button, such as graphical element 281 which may or may not be provided by an operating system of client device 206. In FIG. 2B, the user instead uses free-form natural language input to transition back to the shoe shopping dialog context: "HEY ASSISTANT—BACK TO SHOE SHOPPING." In some implementations, the same breakpoint BP1 may once again be inserted into this portion of the transcript, e.g., so that different portions of the transcript associated with this breakpoint may be reassembled together later as being related to a single dialog context.

When transitioning back to a prior dialog context, it may be beneficial to remind the user of what they were discussing with the automated assistant. Accordingly, in various implementations, after transitioning back to a prior dialog context, automated assistant 120 may generate natural language output that conveys at least one or more of the intents of the transitioned-to dialog context and one or more slot values of the transitioned-to dialog context. Automated assistant 120 may then cause this natural language output to be presented at the same computing device or a different computing device operated by the user. For example, in FIG. 2B, automated assistant 120 summarizes the past dialog context by saying, "YOU WERE INTERESTED IN BLACK COLOR WOMEN'S DRESS SHOES IN SIZE 7."

Figure 2C:
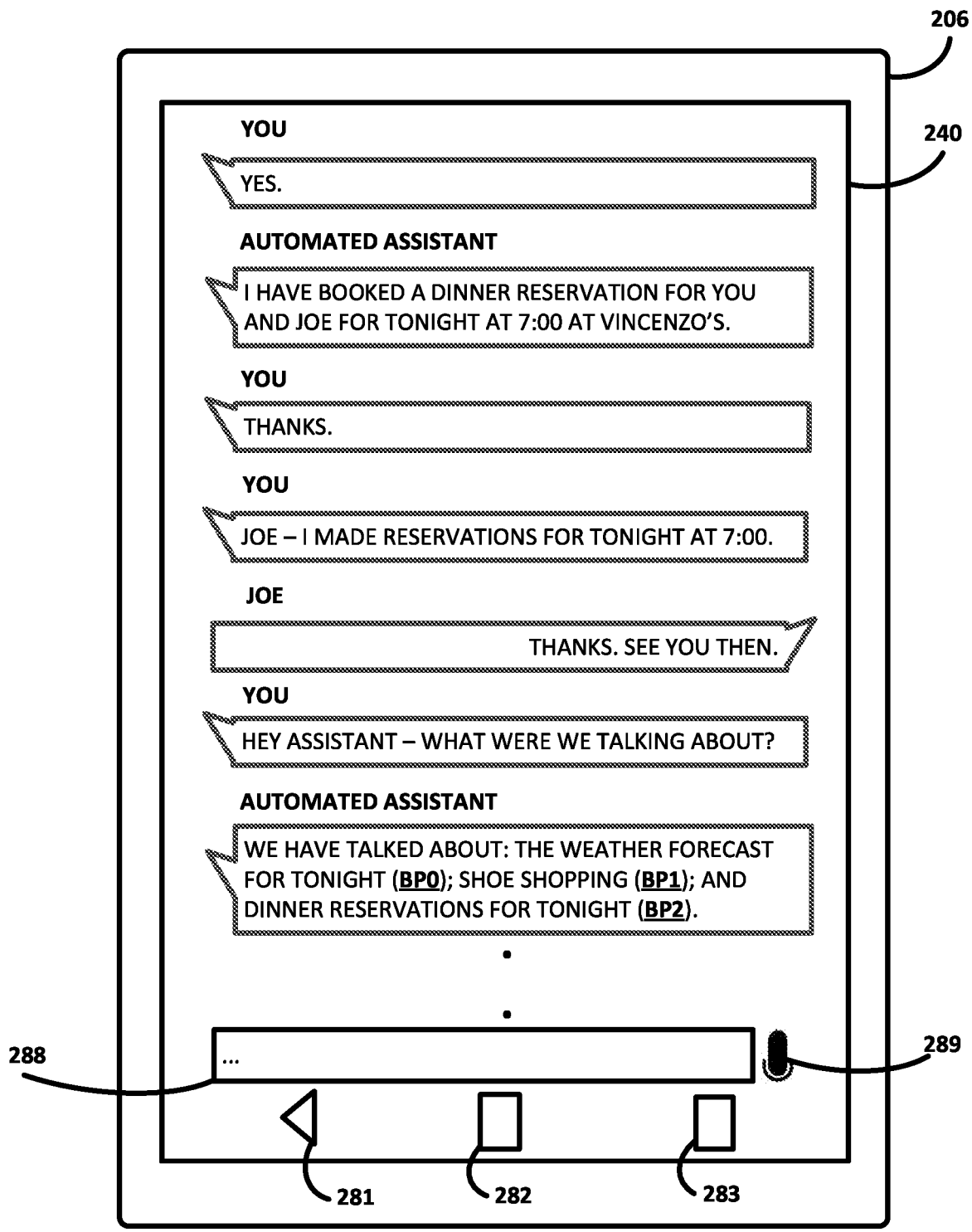

FIG. 2C depicts an alternative dialog that might occur after Joe says, "THANKS. SEE YOU THEN." Instead of the user proactively transitioning back to shoe shopping, the user instead asks automated assistant 120, "HEY ASSISTANT—WHAT WERE WE TALKING ABOUT?" Automated assistant 120 responds by outputting an enumerate list of past dialog contexts, "WE HAVE TALKED ABOUT: THE WEATHER FORECAST FOR TONIGHT; SHOE SHOPPING; AND DINNER RESERVATIONS FOR TONIGHT." As shown in FIG. 2C, each of these past topics may be associated with a breakpoint. In some embodiments, the breakpoints may actually be rendered on touchscreen 240, e.g., so that the user could select one to transition back to the respective dialog context.

Figure 2D:
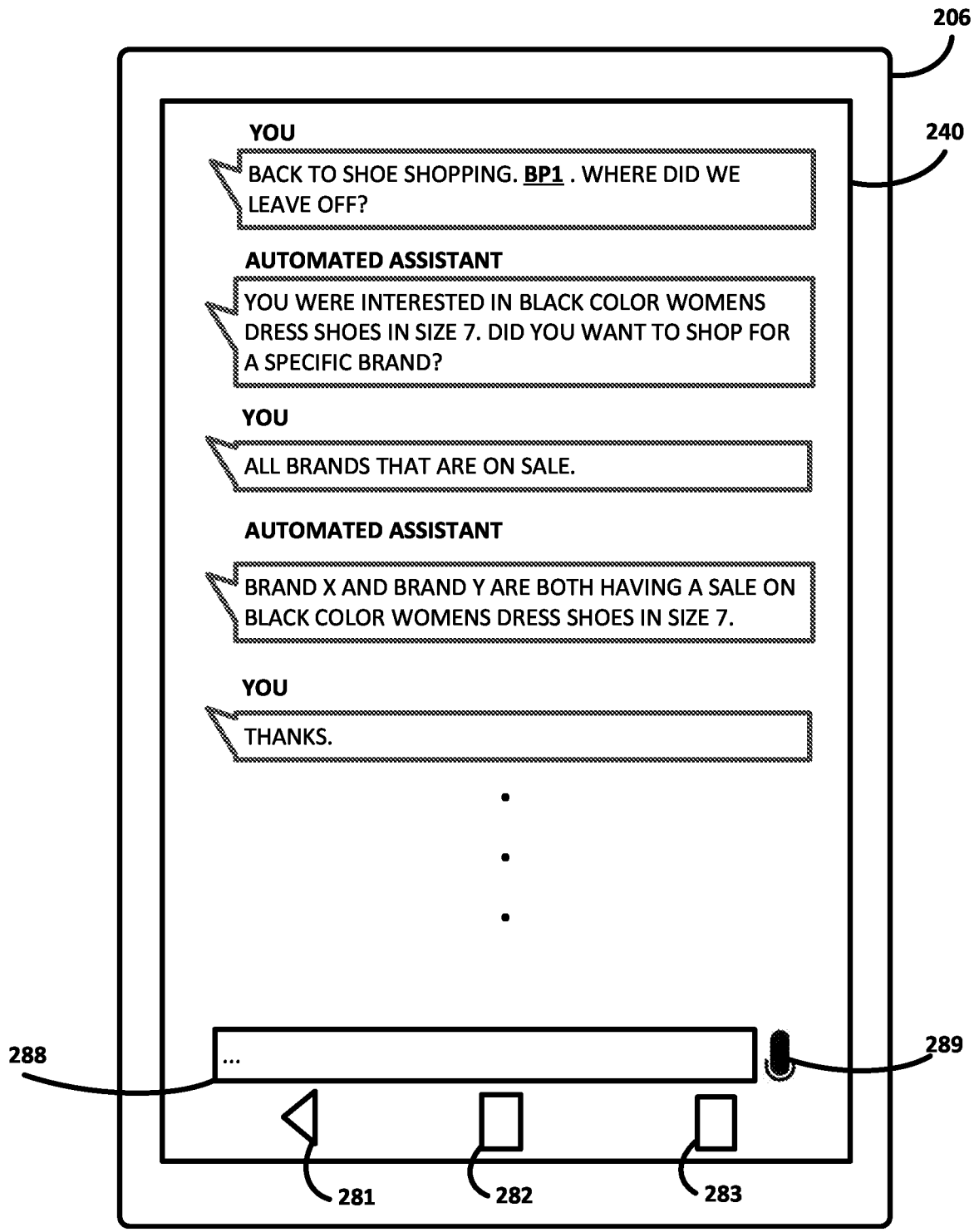

However, in FIG. 2D, the user instead says, "BACK TO SHOE SHOPPING. WHERE DID WE LEAVE OFF?" At this point, automated assistant 120 once again provides summary natural language output about the past conversation, stating, "YOU WERE INTERESTED IN BLACK COLOR WOMEN'S DRESS SHOES IN SIZE 7. DID YOU WANT TO SHOP FOR A SPECIFIC BRAND?" The user then replies, "ALL BRANDS THAT ARE ON SALE," and the shoe shopping conversation resumes.

FIGS. 3A, 3B, 3C, and 3D depict an example dialog between a user 301 and automated assistant 120 by way of a standalone interactive speaker 306 operated by the user 301, in accordance with various implementations. The dialog begins with the user 301 asking the automated assistant 120 of the standalone interactive speaker 306 to "SHOP FOR WOMEN'S DRESS SHOES IN SIZE 7." The reference to "SHOP" and "SHOES" allows the automated assistant 120 to identify a first dialog context of "SHOE SHOPPING". In addition to identifying the first dialog context, the automated assistant 120 may associate a first breakpoint BP1 with the first dialog context. Although the breakpoint is represented as "BP1" in FIG. 3A, this is for illustrative purposes only, and would not likely actually be spoken by user 301.

The automated assistant 120 may ask the user 301 "DO YOU WANT TO SHOP FOR A SPECIFIC COLOR SHOE OR SPECIFIC BRAND?" The user 301 may respond by narrowing the search to "BLACK COLOR SHOES." At this point, automated assistant 120 may interrupt the conversation to provide the following statement, "REMINDER: DINNER TONIGHT AT 7:00 AT VINCENZO'S WITH JOE. WANT TO MAKE A RESERVATION?" This may have been a reminder user 301 set for himself previously, to be delivered at this particular time, or a reminder triggered by someone else, such as Joe. At any rate, the reference to "DINNER" and "RESERVATION" allows automated assistant 120 to identify a second dialog context of "DINNER RESERVATION." In addition to identifying the second dialog context, automated assistant 120 may associate a second breakpoint BP2 with the second dialog context.

Instead of addressing the reminder directly, user 301 changes the subject once again, responding, "WHAT IS THE WEATHER FORECAST FOR TONIGHT?" This may be because, for instance, user 301 would prefer to sit outside if the weather will be nice. The reference to "THE WEATHER FORECAST FOR TONIGHT" allows automated assistant 120 to identify a third dialog context of "THE WEATHER FORECAST FOR TONIGHT." In addition to identifying the third dialog context, automated assistant 120 may associate a third breakpoint BP3 with the third dialog context. Automated assistant 120 may respond that the weather forecast by stating, "WARM AND CLEAR SKIES."

This favorable weather forecast may affect the user's decision in making the dinner reservation. For example, user 301 may respond with "MAKE THE DINNER RESERVATION FOR TONIGHT AT VINCENZO'S WITH PATIO SEATING" rather than choosing to eat inside. In response to the user 301, the automated assistant 120 may interact with a third-party application to make the dinner reservation and alert the user that there is a "DINNER RESERVATION BOOKED FOR TONIGHT AT 7:00 AT VINCENZO'S."

Figure 3A:
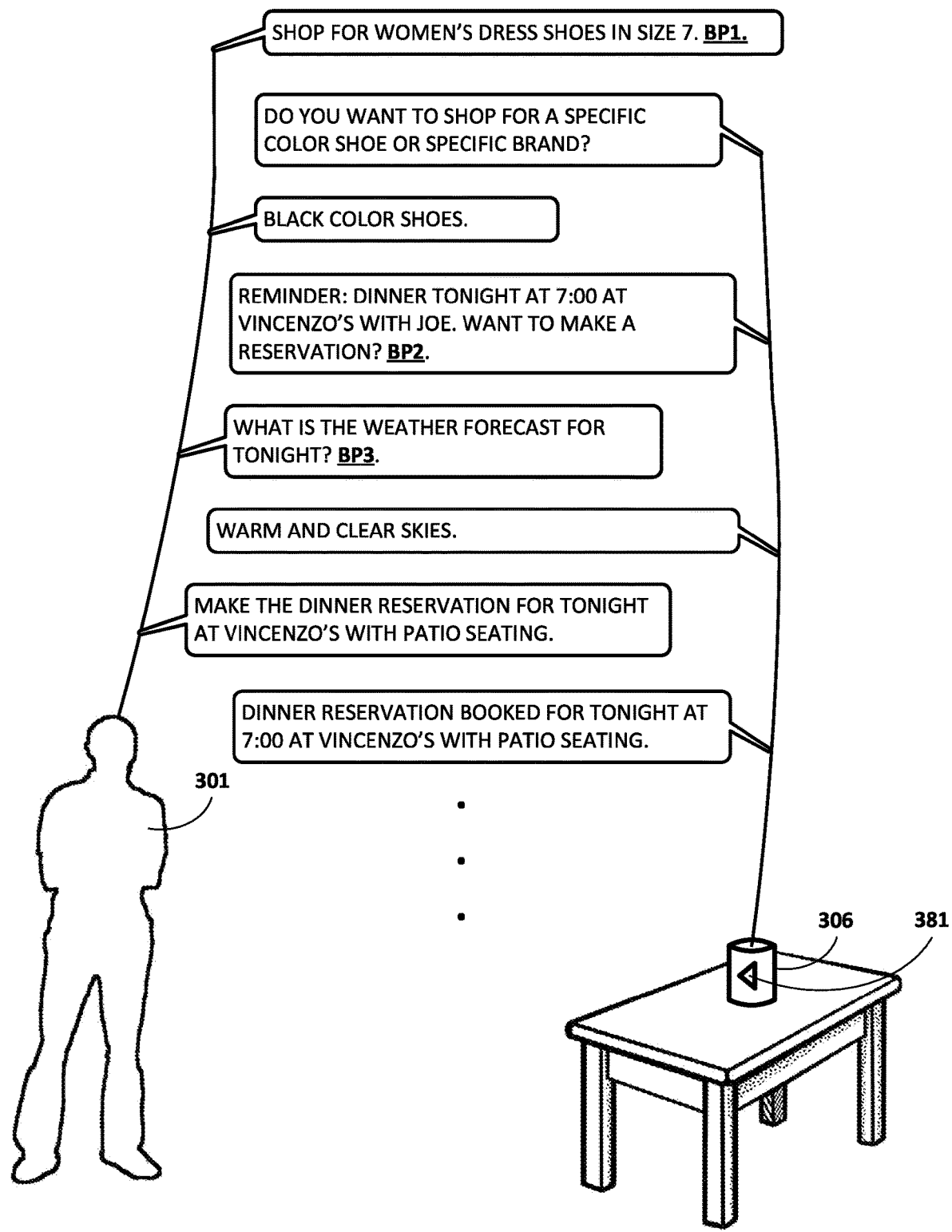
FIG. 3A, FIG. 3B, FIG. 3C, and FIG. 3D depict example dialog between a user and an automated assistant using a standalone interactive speaker, in accordance with various implementations.
Figure 3B:
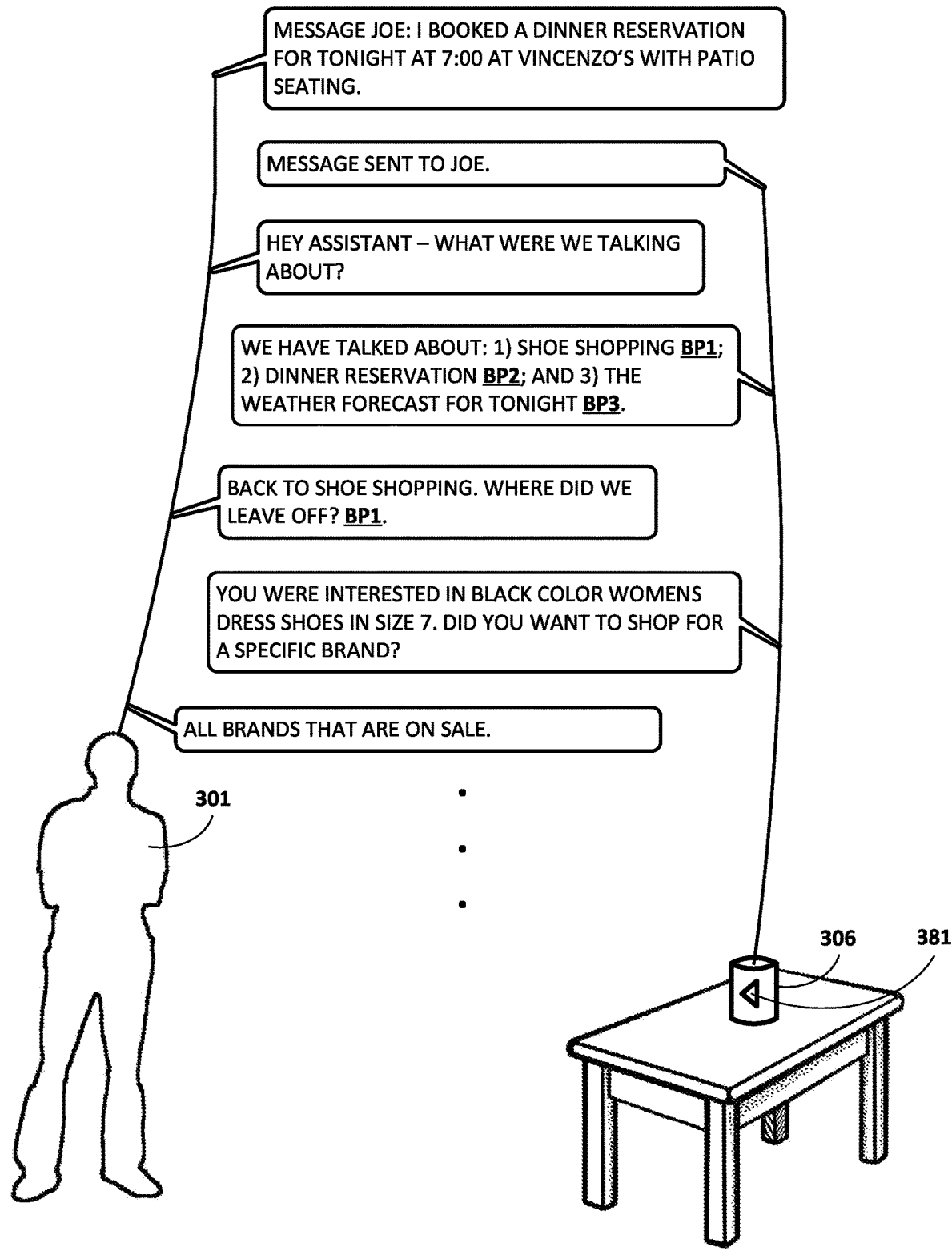

The conversation continues in FIG. 3B. User 301 may request that automated assistant 120 "MESSAGE JOE: I BOOKED A DINNER RESERVATION FOR TONIGHT AT 7:00 AT VINCENZO'S WITH PATIO SEATING." Further, automated assistant 120 may confirm the request by responding "MESSAGE SENT TO JOE." Suppose user 301 has forgotten the previous dialog contexts. As noted above, there are various techniques user 301 may employ to return to prior dialog contexts.

In some implementations, and as illustrated in FIG. 3B, the user 301 may return to a prior dialog context by saying "HEY ASSISTANT—WHAT WERE WE TALKING ABOUT?" In response, the automated assistant 120 may provide an enumerated list of the prior dialog contexts, such as "WE HAVE TALKED ABOUT: 1) SHOE SHOPPING; 2) DINNER RESERVATION; AND 3) THE WEATHER FORECAST FOR TONIGHT." If the user 301 specifies "SHOE SHOPPING", the automated assistant 120 may return to the first dialog context by returning to the dialog associated with the first breakpoint BP1. If the user 301 specifies "DINNER RESERVATION", the automated assistant 120 may return to the second dialog context by returning to the dialog associated with the second breakpoint BP2. If the user 301 specifies "THE WEATHER FORECAST FOR TONIGHT", the automated assistant 120 may return to the third dialog context by returning to the dialog associated with the third breakpoint BP3.

If the user 301 chooses to return to one of the enumerated prior dialog contexts, then automated assistant 120 may provide a summary of the particular enumerated dialog context. For example, user 301 may say "BACK TO SHOE SHOPPING. WHERE DID WE LEAVE OFF?" Automated assistant 120 may respond, "YOU WERE INTERESTED IN BLACK COLOR WOMEN'S DRESS SHOES IN SIZE 7. DID YOU WANT TO SHOP FOR A SPECIFIC BRAND?" User 301 may respond by saying something like "ALL BRANDS THAT ARE ON SALE."

Figure 3C:
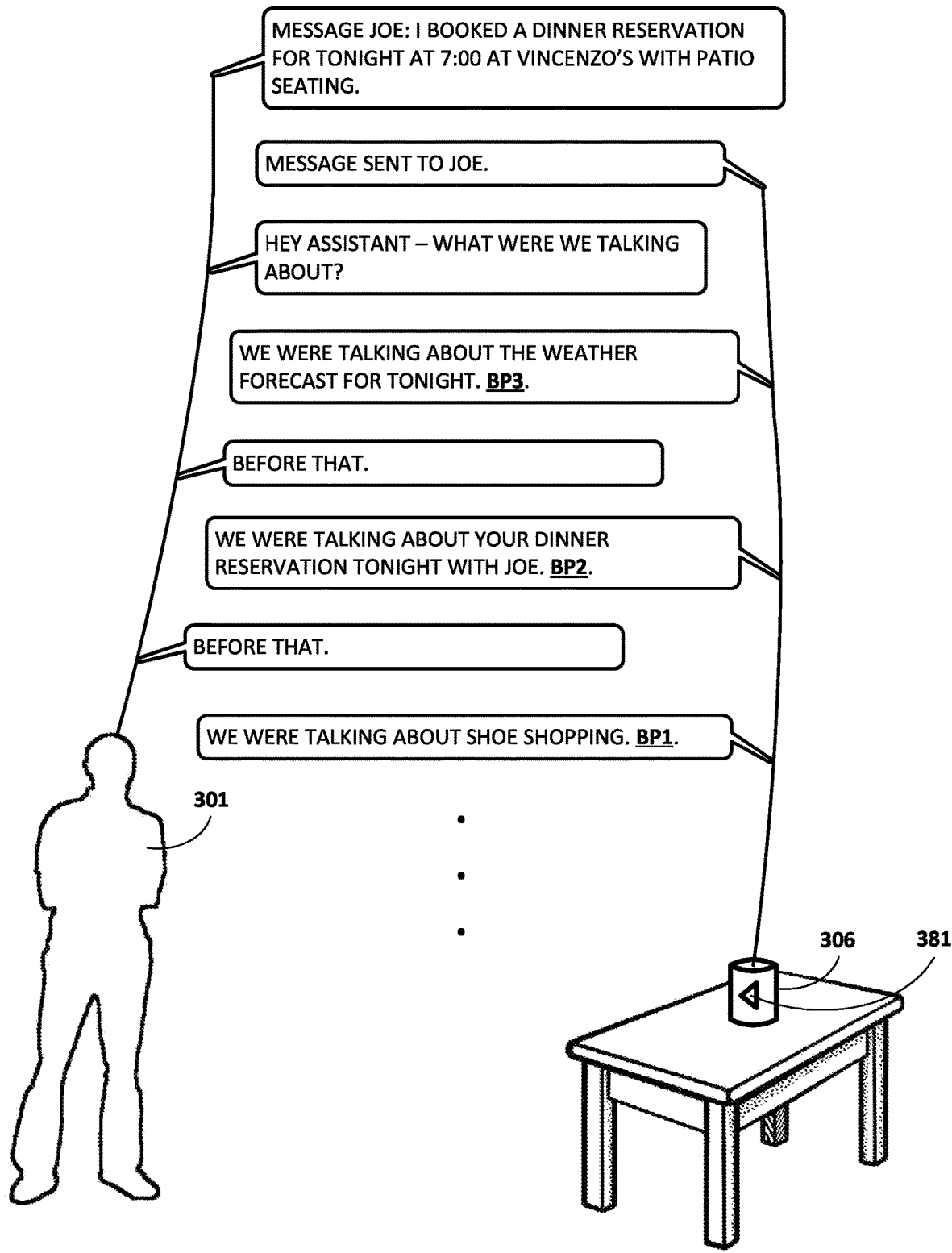

FIG. 3C depicts an alternative dialog to that depicted in FIG. 3B. In some implementations, and as illustrated in FIG. 3C, user 301 may return to an immediate prior dialog context by saying "HEY ASSISTANT—WHAT WERE WE TALKING ABOUT?" In response, the automated assistant 120 may provide the most recent dialog context "WE WERE TALKING ABOUT THE WEATHER FORECAST FOR TONIGHT." However, user 301 may want to return to an earlier dialog context, and can indicate this by saying "BEFORE THAT." In response, automated assistant 120 may provide the earlier dialog context "WE WERE TALKING ABOUT YOUR DINNER RESERVATION TONIGHT WITH JOE." Further, user 301 may want to return (e.g., toggle further) to an even earlier dialog context, and can indicate this by saying "BEFORE THAT." In response, automated assistant 120 may provide the even earlier dialog context "WE WERE TALKING ABOUT SHOE SHOPPING." In this manner, user 301 may arrive at the desired dialog context.

Figure 3D:
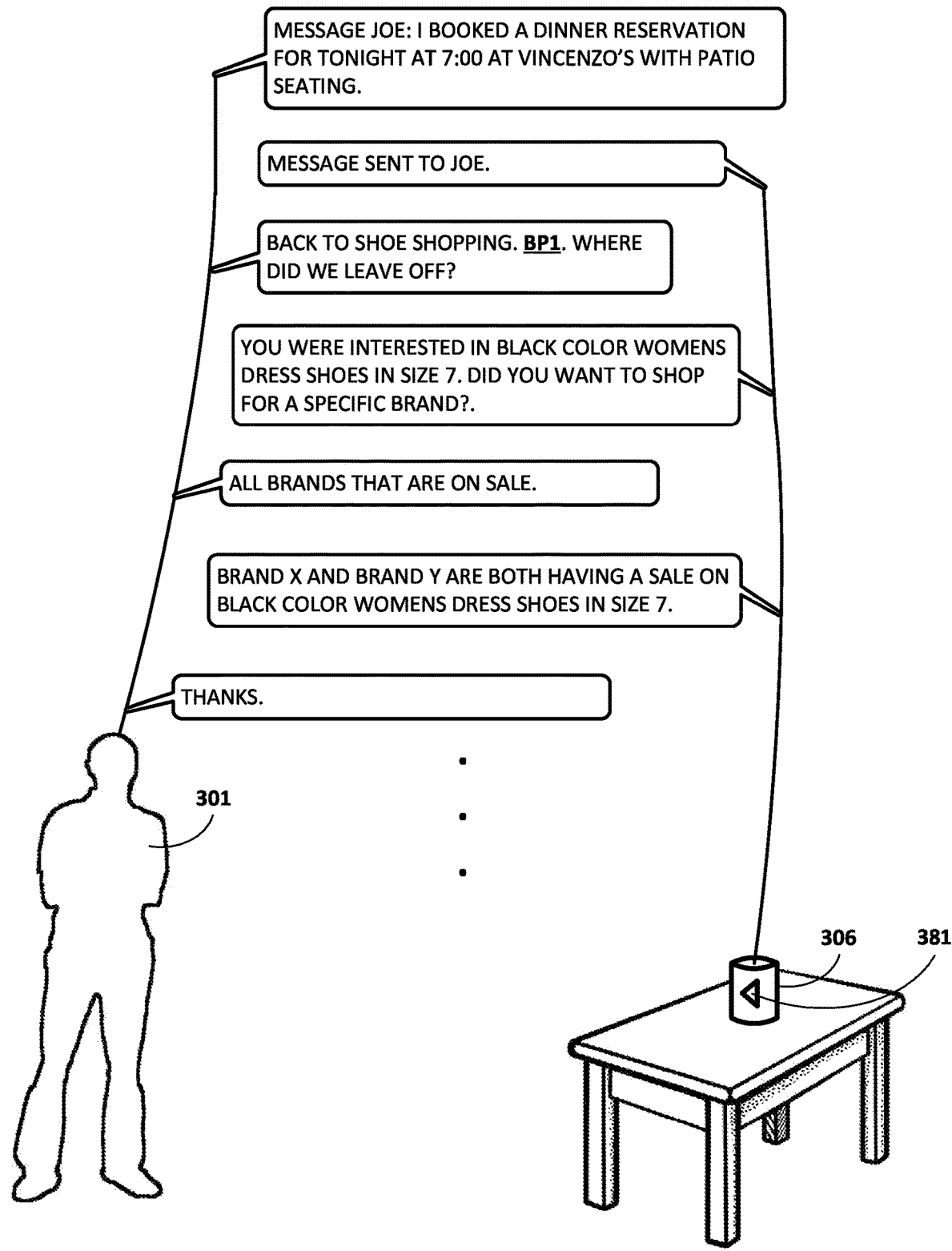

In some implementations, and as illustrated in FIG. 3D, the user 301 may return to a prior dialog context by specifying "BACK TO SHOE SHOPPING. WHERE DID WE LEAVE OFF?" In response, the automated assistant 120 may provide a summary of the prior dialog context "YOU WERE INTERESTED IN BLACK COLOR WOMEN'S DRESS SHOES IN SIZE 7. DID YOU WANT TO SHOP FOR A SPECIFIC BRAND?" The user may then provide spoken output that narrows the search to "ALL BRANDS THAT ARE ON SALE." In response, automated assistant 120 may determine that "BRAND X AND BRAND Y ARE BOTH HAVING A SALE ON BLACK COLOR WOMEN'S DRESS SHOES IN SIZE 7." The dialog based on the prior context may continue or the user 301 may have sufficiently narrowed the search and say "THANKS".

In FIGS. 3A-D, user 301 transitioned between dialog states using vocal commands. However, this is not limiting. As an alternative, user 301 could have interacted with a back button 381 on standalone interactive speaker 306. For example, standalone interactive speaker 306 may include a rudimentary display—with one or more LEDs disposed under a capacitive touchpad, for instance—that it may operate to render a selectable back button. Additionally or alternatively, some standalone interactive speakers may include attached touchscreen displays that can be used, for instance, to render a back button, or even to render text that summarizes past dialog contexts, lists past dialog contexts (and the listed items could be manually selected by a user), and so forth.

Figure 4:
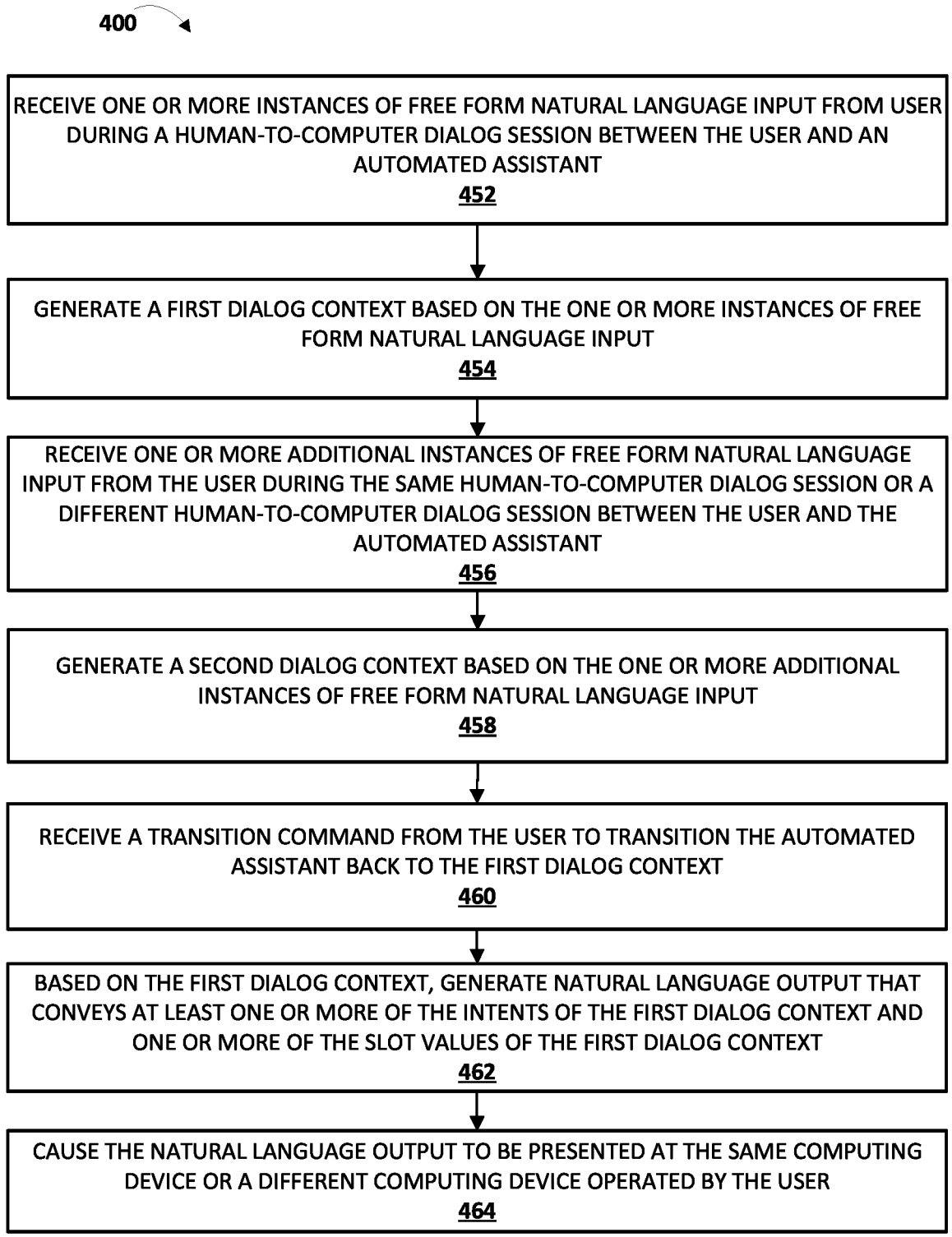
FIG. 4 depicts a flowchart illustrating an example method according to implementations disclosed herein.

FIG. 4 is a flowchart illustrating an example method 400 according to implementations disclosed herein. For convenience, the operations of the flowchart are described with reference to a system that performs the operations. This system may include various components of various computer systems, such as one or more components of computing systems that implement automated assistant 120. Moreover, while operations of method 400 are shown in a particular order, this is not meant to be limiting. One or more operations may be reordered, omitted or added.

At block 452, the system may receive one or more instances of free-form natural language input from a user during a human-to-computer dialog session between the user and the automated assistant 120. This free form input may be typed (e.g., using message exchange client 107) and/or spoken and then speech recognized into text. At block 454, the system may generate a first dialog context based on the one or more instances of free-form natural language input. The first dialog context may include, for instance, one or more intents of the user and one or more slot values associated with the one or more intents.

At block 456, the system may receive one or more additional instances of free-form natural language input from the user during the same human-to-computer dialog session or a different human-to-computer dialog session between the user and the automated assistant 120. These additional instances of free-form natural language input may relate to a different subject than those of block 452. At block 458, the system may generate a second dialog context based on the one or more additional instances of free-form natural language input. The second dialog context may include one or more additional intents of the user and may be considered semantically distinct from the first dialog context generated at block 454.

At block 460, the system may receive a transition command from the user to transition the automated assistant 120 from the second dialog context back to the first dialog context. This command may be spoken or provided using another input modality, e.g., using a back button. At block 462, the system may, based on the first dialog context, generate natural language output that conveys at least one or more of the intents of the first dialog context and one or more of the slot values of the first dialog context. At block 464, the system may cause the natural language output to be presented at the same computing device or a different computing device operated by the user. For example, cloud-based automated assistant components 119 may transmit text of the natural language output to speech capture/TTS/STT module 114, which may convert the text to speech and output via one or more speakers of client device 106.

In some implementations, a user may be taken out of a conversation with automated assistant 120 in order to engage with a distinct software application, which in some cases may be a third party application that is accessible by the user from the human-to-computer dialog with automated assistant 120. This may occur, for instance, when automated assistant 120 presents the user with a so-called "deep link" that is selectable by the user to launch the distinct software application. Such a deep link may be presented by automated assistant 120 based on, for instance, one or more intents or slot values detected during the human-to-computer dialog. In some such implementations, the distinct software application may include a graphical user interface that includes a selectable element, such as a back button, that is selectable to transition back to an interface usable to interact with automated assistant 120, with the dialog context that was active prior to selection of the deep link being active once again. In other implementations, the user may operate a back button that is not specifically related to the distinct software application, such as a back button rendered by an underlying operating system, to go back.

Figure 5:
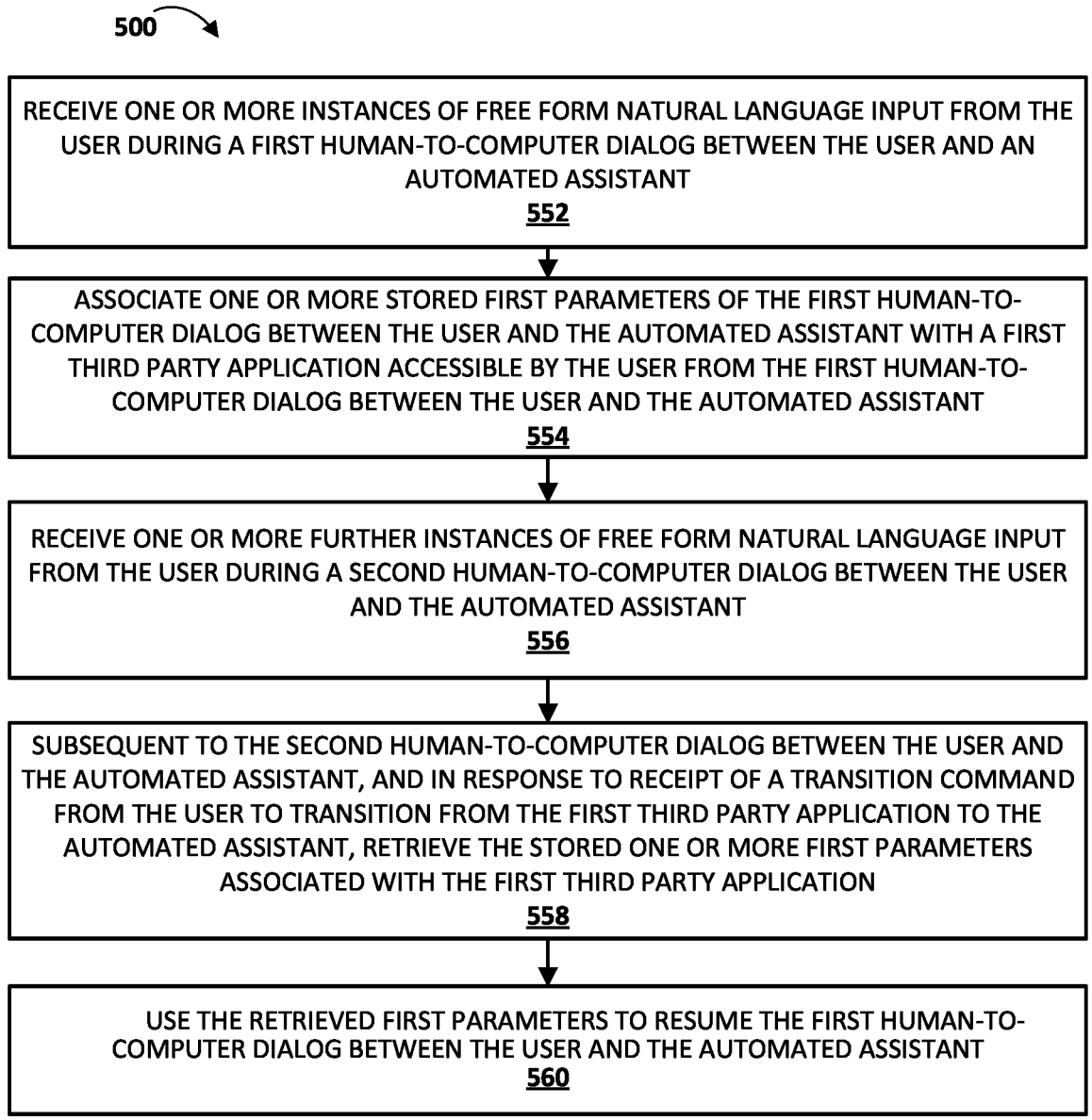
FIG. 5 illustrates an example architecture of a computing device.

FIG. 5 depicts an example method 500 for practicing selected aspects of the present disclosure, in accordance with various embodiments. For convenience, the operations of the flow chart are described with reference to a system that performs the operations. This system may include various components of various computer systems. Moreover, while operations of method 500 are shown in a particular order, this is not meant to be limiting. One or more operations may be reordered, omitted or added.

At block 552, the system may receive, at one or more input components of a computing device operated by a user, one or more instances of free form natural language input from the user during a first human-to-computer dialog between the user and an automated assistant implemented at least in part by one or more of the processors. This operation may be similar to block 452 of FIG. 4.

At block 554, the system may associate one or more stored first parameters of the first human-to-computer dialog between the user and the automated assistant with a first third party application accessible by the user from the first human-to-computer dialog between the user and the automated assistant. These parameters may be stored in computer memory that is, for instance, located at a remote server and/or locally at the client device. In some implementations, storing the one or more first parameters may include creating a configuration file for the one or more first parameters and storing the configuration file in the computer memory. In some cases, the configuration file may be created in a format such as JSON, and may in fact represent a dialog content. As an example use case, when a deep link to the first third party application (e.g., a shoe shopping application) is presented as part of the first human-to-computer dialog, a dialog context, which may include one or more intents, slot values, mentioned entities, etc. (e.g., desired shoe size, style, color, etc.), may be associated with the first third party application.

At block 556, the system may receive, at one or more input components of the computing device, one or more further instances of free form natural language input from the user during a second human-to-computer dialog between the user and the automated assistant. This operation may be similar to block 456 of FIG. 4.

Subsequent to the second human-to-computer dialog between the user and the automated assistant, and in response to receipt of a transition command from the user to transition from the first third party application to the automated assistant, at block 558, the system may retrieve, e.g., from computer memory, the stored one or more first parameters associated with the first third party application. At block 560, the system may use the retrieved first parameters to resume the first human-to-computer dialog between the user and the automated assistant. In this way the user can resume the conversation with the automated assistant prior to the user selecting the deep link to the third party application.

In some implementations associating the one or more stored first parameters of the first human-to-computer dialog with the first third party application may include creating a token that is invokable, e.g., in response to the receipt of the transition command to transition from the first third party application to the automated assistant, to retrieve the stored one or more first parameters associated with the first third party application. In some such implementations, the token may take the form of a link between the stored one or more first parameters and the first third party application.

Figure 6:
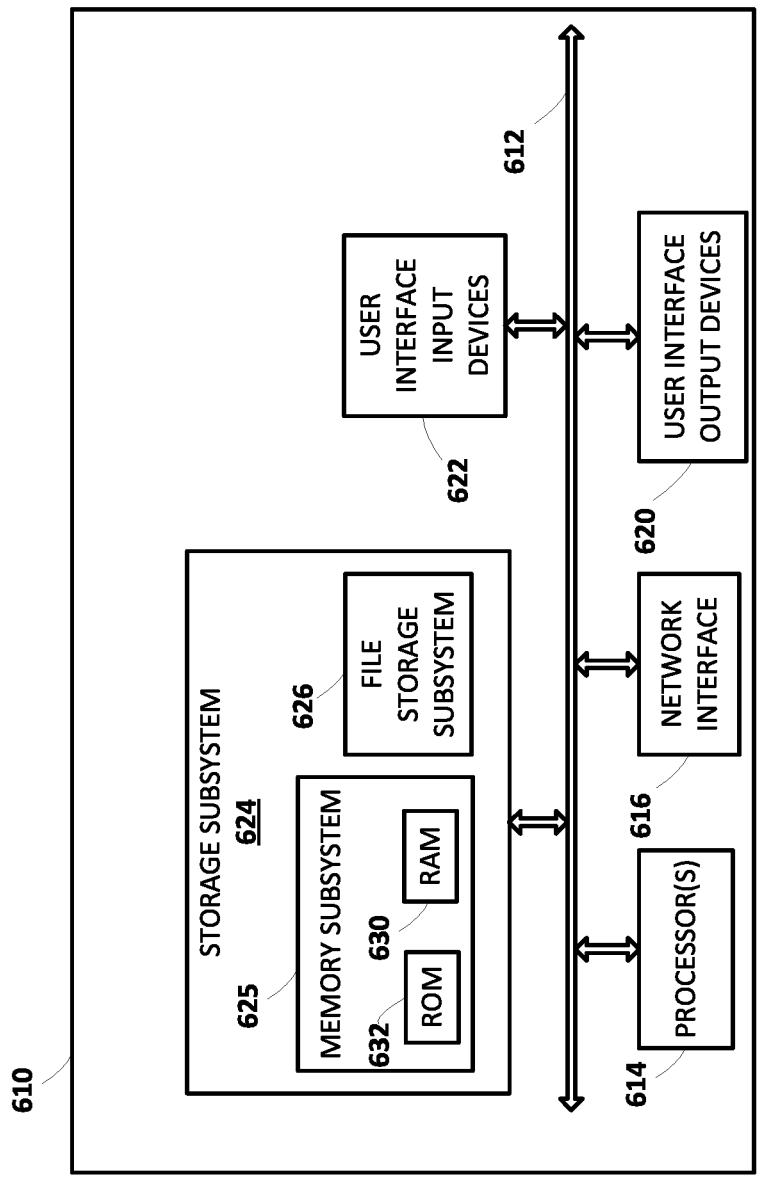
FIG. 6 is a block diagram of an example computing device.

FIG. 6 is a block diagram of an example computing device 610 that may optionally be utilized to perform one or more aspects of techniques described herein. In some implementations, one or more of a client computing device, user-controlled resources engine 130, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 4 and 5, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   receiving, at one or more input components of a computing device operated by a user, one or more instances of free form natural language input from the user during a first human-to-computer dialog between the user, an automated assistant implemented at least in part by one or more of the processors, and a third party application, wherein the automated assistant brokers a transaction between the user and the third party application based on one or more of the instances of free form natural language input;
   storing, for subsequent use, one or more first parameters of the first human-to-computer dialog, wherein the one or more first parameters include an intent and one or more slot values;
   receiving, at one or more of the input components of the computing device, one or more further instances of free form natural language input from the user during a second human-to-computer dialog between the user and the automated assistant, where the second human-to-computer dialog occurs after, and is semantically distinct from, the first human-to-computer dialog;
   storing one or more second parameters of the second human-to-computer dialog between at least the user and the automated assistant in association with a second dialog context, wherein the first and second dialog contexts have mismatched intents; and
   subsequent to the second human-to-computer dialog between the user and the automated assistant, retrieving the stored one or more first parameters associated with the third party application, and, in response to a request from the user, using the retrieved first parameters to generate a natural language summary of the first human-to-computer dialog that is rendered by one or more output components of the computing device of the user, wherein the natural language summary includes the previously-stored intent and one or more slot values of the first human-to-computer dialog.

2. The method of claim 1, wherein the request from the user comprises one or more words that are matched to one or more of the first parameters.

3. The method of claim 1, wherein the request from the user comprises one or more words that are matched to one or more topics associated with the first dialog context.

4. The method of claim 1, wherein the first and second dialog contexts do not include any overlapping intents.

5. The method of claim 1, wherein the one or more one or more first parameters and the one or more second parameters are stored in computer memory that is local to the computing device operated by the user.

6. The method of claim 1, wherein the third party application comprises a ride-sharing application.

7. The method of claim 1, wherein the third party application comprises a reservation application.

8. A system comprising one or more processors and memory storing instructions that, in response to execution of the instructions, cause the one or more processors to:
   receive, at one or more input components of a computing device operated by a user, one or more instances of free form natural language input from the user during a first human-to-computer dialog between the user, an automated assistant implemented at least in part by one or more of the processors, and a third party application, wherein the automated assistant brokers a transaction between the user and the third party application based on one or more of the instances of free form natural language input;
   store, for subsequent use, one or more first parameters of the first human-to-computer dialog, wherein the one or more first parameters include an intent and one or more slot values;
   receive, at one or more of the input components of the computing device, one or more further instances of free form natural language input from the user during a second human-to-computer dialog between the user and the automated assistant, where the second human-to-computer dialog occurs after, and is semantically distinct from, the first human-to-computer dialog;

store one or more second parameters of the second human-to-computer dialog between at least the user and the automated assistant in association with a second dialog context, wherein the first and second dialog contexts have mismatched intents; and subsequent to the second human-to-computer dialog between the user and the automated assistant, retrieve the stored one or more first parameters associated with the third party application, and, in response to a request from the user, using the retrieved first parameters to generate a natural language summary of the first human-to-computer dialog that is rendered by one or more output components of the computing device of the user, wherein the natural language summary includes the previously-stored intent and one or more slot values of the first human-to-computer dialog.

9. The system of claim 8, wherein the request from the user comprises one or more words that are matched to one or more of the first parameters.

10. The system of claim 8, wherein the request from the user comprises one or more words that are matched to one or more topics associated with the first dialog context.

11. The system of claim 8, wherein the first and second dialog contexts do not include any overlapping intents.

12. The system of claim 8, wherein the one or more one or more first parameters and the one or more second parameters are stored in computer memory that is local to the computing device operated by the user.

13. The system of claim 8, wherein the third party application comprises a ride-sharing application.

14. The system of claim 8, wherein the third party application comprises a reservation application.

15. A non-transitory computer-readable medium comprising instructions that, in response to execution of the instructions by a processor, cause the processor to:

receive, at one or more input components of a computing device operated by a user, one or more instances of free form natural language input from the user during a first human-to-computer dialog between the user, an automated assistant implemented at least in part by one or more of the processors, and a third party application, wherein the automated assistant brokers a transaction between the user and the third party application based on one or more of the instances of free form natural language input;

store, for subsequent use, one or more first parameters of the first human-to-computer dialog, wherein the one or more first parameters include an intent and one or more slot values;

receive, at one or more of the input components of the computing device, one or more further instances of free form natural language input from the user during a second human-to-computer dialog between the user and the automated assistant, where the second human-to-computer dialog occurs after, and is semantically distinct from, the first human-to-computer dialog;

store one or more second parameters of the second human-to-computer dialog between at least the user and the automated assistant in association with a second dialog context, wherein the first and second dialog contexts have mismatched intents; and subsequent to the second human-to-computer dialog between the user and the automated assistant, retrieve the stored one or more first parameters associated with the third party application, and, in response to a request from the user, using the retrieved first parameters to generate a natural language summary of the first human-to-computer dialog that is rendered by one or more output components of the computing device of the user, wherein the natural language summary includes the previously-stored intent and one or more slot values of the first human-to-computer dialog.

16. The non-transitory computer-readable medium of claim 15, wherein the request from the user comprises one or more words that are matched to one or more of the first parameters.

17. The non-transitory computer-readable medium of claim 15, wherein the request from the user comprises one or more words that are matched to one or more topics associated with the first dialog context.

* * * * *